United States Patent
Dent (10) Patent No.: US 7,801,521 B2
(45) Date of Patent: Sep. 21, 2010

(54) SYSTEM AND METHOD FOR COMMUNICATING WITH AIRCRAFT THROUGH CELLULAR BASE STATION TOWERS

(75) Inventor: Paul Wilkinson Dent, Pittsboro, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1167 days.

(21) Appl. No.: 11/383,120

(22) Filed: May 12, 2006

(65) Prior Publication Data

US 2006/0264242 A1    Nov. 23, 2006

Related U.S. Application Data

(60) Provisional application No. 60/682,055, filed on May 18, 2005.

(51) Int. Cl.
*H04W 4/00*    (2009.01)

(52) U.S. Cl. .................. 455/431; 455/430; 343/708; 343/777; 343/824; 342/57; 342/58

(58) Field of Classification Search .............. 455/430, 455/431, 561, 562.1; 343/708, 777, 824; 342/57, 58, 36

See application file for complete search history.

(56) References Cited

U.S. PATENT DOCUMENTS

| 4,249,181 | A | 2/1981 | Lee |
| 5,444,762 | A | 8/1995 | Frey et al. |
| 5,557,656 | A | 9/1996 | Ray et al. |
| 6,108,539 | A | 8/2000 | Ray et al. |
| 6,813,493 | B2 * | 11/2004 | Criqui et al. ............... 455/431 |
| 2003/0003959 | A1 | 1/2003 | Tsui et al. |
| 2006/0229103 | A1 * | 10/2006 | Monk ...................... 455/562.1 |

FOREIGN PATENT DOCUMENTS

WO    WO 03/052866 A    6/2003

\* cited by examiner

*Primary Examiner*—Temica M Beamer (57) ABSTRACT

An antenna arrangement, method, and cellular communications system for transmitting and receiving signals between a base station tower, ground-based mobile subscribers, and an aircraft. The antenna arrangement includes a vertically oriented array of antenna elements, and a feedline arrangement that feeds the antenna elements with progressively phase-retarded signals, thereby generating an elevated antenna beam directed upward toward the aircraft and away from the ground-based mobile subscribers. In one embodiment, the antenna arrangement also generates a horizontal antenna beam for communicating with the ground-based subscribers. The horizontal beam and the elevated beam are sufficiently separated in elevation to prevent mutual interference when using the same frequency spectrum.

29 Claims, 8 Drawing Sheets

SYSTEM AND METHOD FOR COMMUNICATING WITH AIRCRAFT THROUGH CELLULAR BASE STATION TOWERS

CROSS-REFERENCE TO RELATED APPLICATIONS

This application claims the benefit of U.S. Provisional Application No. 60/682,055, filed May 18, 2005, the disclosure of which is incorporated herein by reference.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to radio communications. More particularly and not by way of limitation, the present invention is directed to a system and method for communicating with aircraft through cellular base station towers.

For air traffic control communications, civil aircraft in flight communicate with ground stations utilizing narrowband channels in the 116-174 MHz region of the radio spectrum. Aircraft are also assigned a 2-MHz segment of the spectrum in each of an uplink band and a downlink band in the 800-900 MHz region for extending access to terrestrial communications networks to passengers in flight. The latter has been used to provide telephone services via seat-back phones to the passenger cabin.

In a related area, cellular communication networks in the U.S. are assigned a much wider segment of the spectrum for communications with mobile stations. For example, cellular communication networks operating in the 1900-MHz band are assigned a 60-MHz segment in both the uplink and downlink directions. Modern cellular communication networks are upgrading to higher data rates to provide Internet communications and other so-called multi-media communications to mobile subscribers. The Internet is a medium that has become as ubiquitous as the telephone and favors use of much higher bandwidths than telephony. Such broadband services are not available for communications with aircraft because they cannot be provided satisfactorily within the 2-MHz segment currently assigned to ground-to-air communications.

Figure 1A:
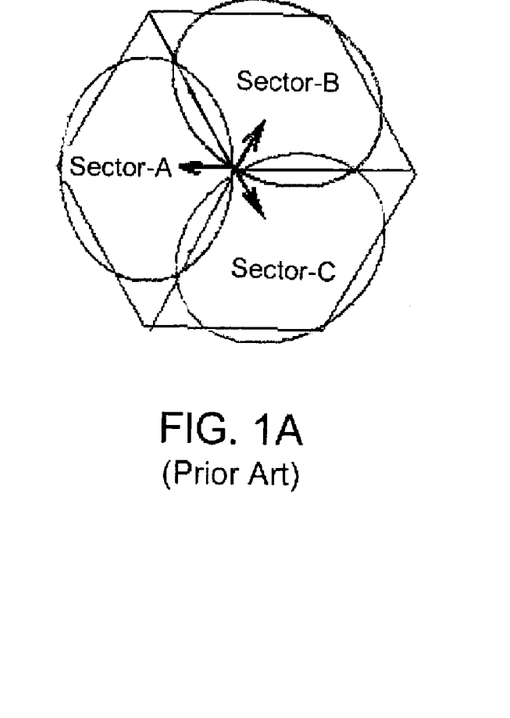
FIG. 1A (Prior Art) is a top view of a typical antenna radiation pattern illustrating a horizontal radiation pattern for an existing cellular base station tower.

FIG. 1A is a top view of a typical antenna radiation pattern illustrating a horizontal radiation pattern for an existing cellular base station tower. In the illustrated configuration, a centrally located sectorized antenna transmits and receives RF signals in Sector-A, Sector-B, and Sector-C of a cell defining the service area of the base station. In the horizontal plane, each of three separate antenna arrays covers an associated 120° sector of azimuth. The horizontal beam shape is usually chosen to be about −12 dB from the peak of the main lobe at the +/−60° sector edge, since only half the maximum range is needed in that direction. The −3 dB beamwidth is of the order of +/−30°, which is the same as or similar to what would have been used to cover 60° sectors.

Figure 1B:
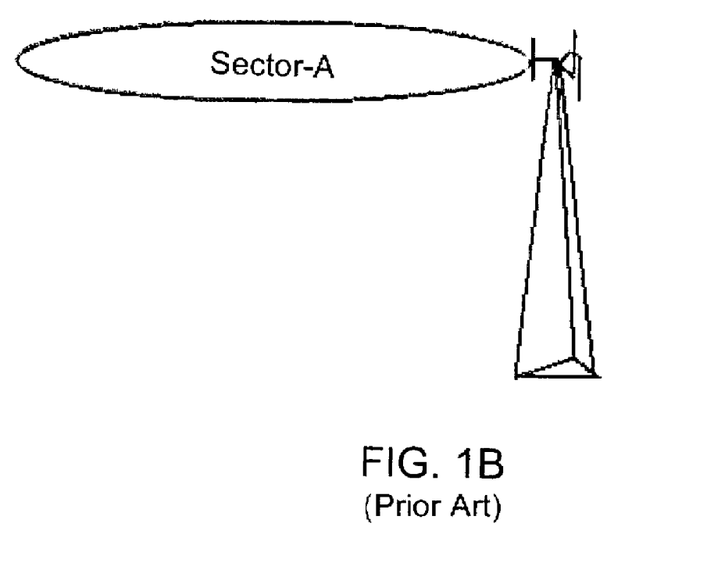
FIG. 1B (Prior Art) is a side view of a typical antenna radiation pattern illustrating a vertical radiation pattern for one sector of an existing cellular base station tower.

FIG. 1B is a side view of a typical antenna radiation pattern illustrating a vertical radiation pattern for Sector-A of the existing cellular base station tower of FIG. 1A. Although not illustrated, the vertical radiation patterns in the other sectors are similarly positioned in the vertical plane. The pattern in each of the antenna sectors is formed as a horizontally oriented lobe. In the vertical plane, the beamwidth is typically narrower because there is rarely any requirement to cover stations other than at ground level. In some cells, the antenna pattern may be tilted down a small amount (for example 5°) depending on the tower height, cell size, and terrain. The typical directive gain of a cellular base station antenna is 18 dBI, which may comprise a factor of 6 (i.e., 8 dB) directivity in the horizontal plane and a factor of 10 (i.e., 10 dB) in the vertical plane. The 10 dB gain in the vertical plane may include a 4 dB vertical directivity gain for each antenna element and a 6 dB array gain due to co-phasing four such elements.

The vertical radiation pattern for existing cellular base station towers is thus optimized for communicating with mobile phones on the ground or in buildings. The radiation pattern provides insufficient gain at the higher elevation angles needed to communicate with aircraft in flight.

It is desirable to provide wideband communications to aircraft in flight to provide a variety of multi-media services. It would be advantageous to have an antenna arrangement, system, and method for providing wideband communications services to aircraft without demanding more of the radio spectrum and without interfering with ground-based subscribers. The present invention provides such an arrangement, system, and method.

BRIEF SUMMARY OF THE INVENTION

The present invention provides a new antenna connection on a cellular base station tower for transmitting or receiving signals at an angle upwards away from the horizontal plane so as to communicate with aircraft at cruising altitude without interfering with terrestrial users using the same frequencies. In this way, the cellular frequency bands may be re-used for communicating information to and from aircraft, and wideband multi-media services may be provided to the aircraft and to airborne subscribers within.

Thus, in one aspect, the present invention is directed to an antenna arrangement in a cellular base station for transmitting and receiving signals between the base station and ground-based mobile subscribers operating within a served cell, and between the base station and an aircraft flying through the served cell. The antenna arrangement includes means for generating a horizontal antenna beam through which signals are transmitted and received between the base station and the ground-based subscribers; and means for generating an elevated antenna beam through which signals are transmitted and received between the base station and the aircraft.

In another aspect, the present invention is directed to an antenna arrangement in a cellular base station for transmitting and receiving signals between the base station and an aircraft. The antenna arrangement includes a vertically oriented array of antenna elements; and a feedline arrangement connected to each of the antenna elements for feeding the antenna elements with progressively phase-retarded signals, thereby generating an elevated antenna beam directed upward toward the aircraft.

In yet another aspect, the present invention is directed to a method in a cellular base station for transmitting and receiving signals between the base station and ground-based mobile subscribers operating within a served cell, and between the base station and an aircraft flying through the served cell, wherein the base station includes an antenna arrangement having a vertically oriented array of antenna elements. The method includes generating with the vertically oriented array of antenna elements, a horizontal antenna beam through which signals are transmitted and received between the base station and the ground-based subscribers; and generating with the vertically oriented array of antenna elements, an elevated antenna beam through which signals are transmitted and received between the base station and the aircraft.

In yet another aspect, the present invention is directed to a method in a cellular base station for transmitting and receiving signals between the base station and an aircraft. The method includes the steps of orienting a plurality of antenna elements into a vertical array; connecting a feedline arrangement to each of the antenna elements; and feeding the antenna elements with progressively phase-retarded signals, thereby generating an elevated antenna beam directed upward toward the aircraft.

In yet another aspect, the present invention is directed to a cellular communications system for communicating with ground-based mobile subscribers located within a service region and with an aircraft flying through the service region. The service region is provided with a plurality of ground-based antenna towers spaced at intervals, and each of the antenna towers serves a cell within the service region. The system includes means for sending communication signals from a communications network to the plurality of antenna towers; and an antenna arrangement located on at least one of the antenna towers. The antenna arrangement includes means for generating azimuthally-spaced horizontal antenna beams for communicating with the ground-based subscribers; and means for generating azimuthally-spaced elevated antenna beams separated in the vertical plane from the horizontal antenna beams for communicating with the aircraft.

In yet another aspect, the present invention is directed to a cellular communications system for communicating with ground-based mobile subscribers located within a cell and with an aircraft flying through the cell. The system includes a ground-based base station that includes an antenna arrangement for generating an elevated antenna beam for communicating with the aircraft; a transceiver onboard the aircraft for communicating with the ground-based base station; and a microcellular base station connected to the transceiver for communicating with portable communication devices onboard the aircraft.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

The present invention provides a new antenna configuration on a cellular base station tower for transmitting or receiving signals at an angle upwards away from the horizontal plane so as to communicate with aircraft at cruising altitude without interfering with terrestrial users using the same frequencies. In this way, the cellular frequency bands may be re-used for communicating information to and from aircraft. The information may include air traffic control (ATC) information, information for airborne cellular subscribers, or other wideband multi-media information such as video signals from onboard security equipment and webcams. In one embodiment, a base station tower dedicated to serving aircraft generates only upwardly oriented lobes. In another embodiment, the base station tower generates both a horizontal lobe for terrestrial communications and an upward lobe for aircraft communications. The upward lobe may have a null in the horizontal plane to reduce interference with terrestrial communications being conducted from the same base station.

Figure 2:
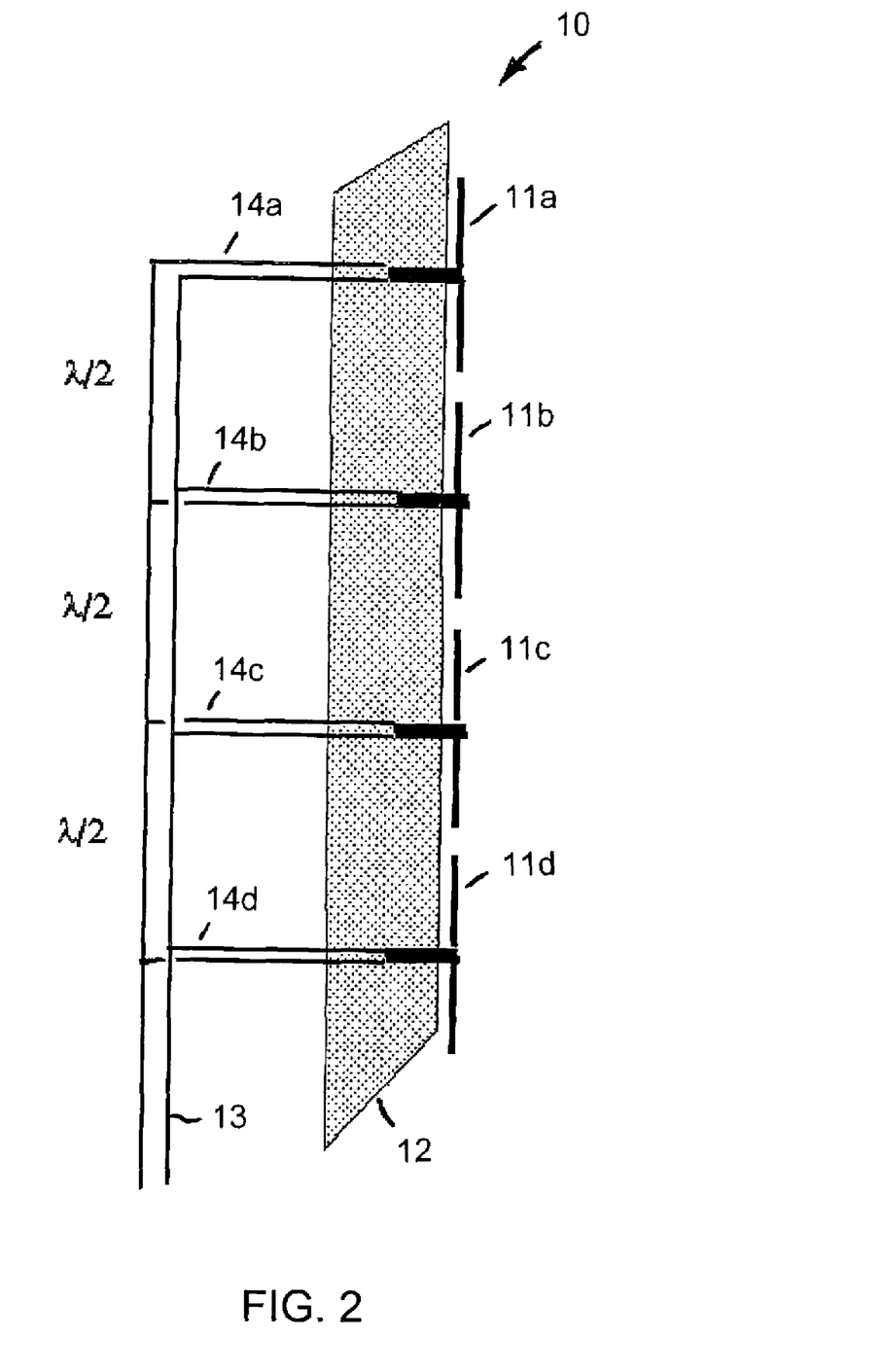
FIG. 2 is a side view illustrating an exemplary vertical collinear array suitable for achieving a radiation pattern at zero degrees in the present invention.

FIG. 2 is a side view illustrating an exemplary vertical collinear array 10 suitable for achieving a radiation pattern at zero degrees in the present invention. Four vertical dipoles (11a-11d) are arranged in front of a reflector 12. Without the reflector, the horizontal radiation pattern of the antennas would be omni directional. By choosing the distance of the dipoles from the reflector, and to a lesser extent by choosing the reflector width, the horizontal radiation pattern can be tailored to illuminate a 120° horizontal sector. Typically, the horizontal radiation pattern desired for sector coverage is about −2.5 dB down on peak radiation at +/−30°, and −12 dB down on peak at +/−60°.

The vertical radiation pattern is a combination of the dipole vertical radiation pattern, as modified by the presence of the reflector, and an array factor. The array factor enhances the radiation pattern at zero degrees elevation when the dipoles are connected in phase by a suitable feedline arrangement. For example, a feeder line 13 may connect the dipoles to taps 14a-14d spaced one-half wavelength ($\lambda/2$) apart. The feeder line compensates for the 180° phase shift of a half-wave line by reversing the connections to alternate dipoles, so that they are connected in phase. This feedline arrangement is exemplary only, and many other arrangements are possible, such as connecting adjacent pairs of elements to a common feedpoint, and then connecting the common feedpoints for each pair to a single common feedpoint.

FIG. 2 is purely exemplary and many other types of antenna elements may be used, such as patches, slots, or folded dipoles, and many different feeder arrangements may be used, involving coaxial cables or open-wire line, couplers, or hybrids. In addition, the antenna elements do not need to be fed in phase. If they are fed with a progressive phase delay moving upwards, the result will be a vertical radiation pattern that is tilted upwards. This upward tilt may be compensated for by tilting the entire array down so that the peak of the radiation is once more at zero degrees elevation.

Figure 3:
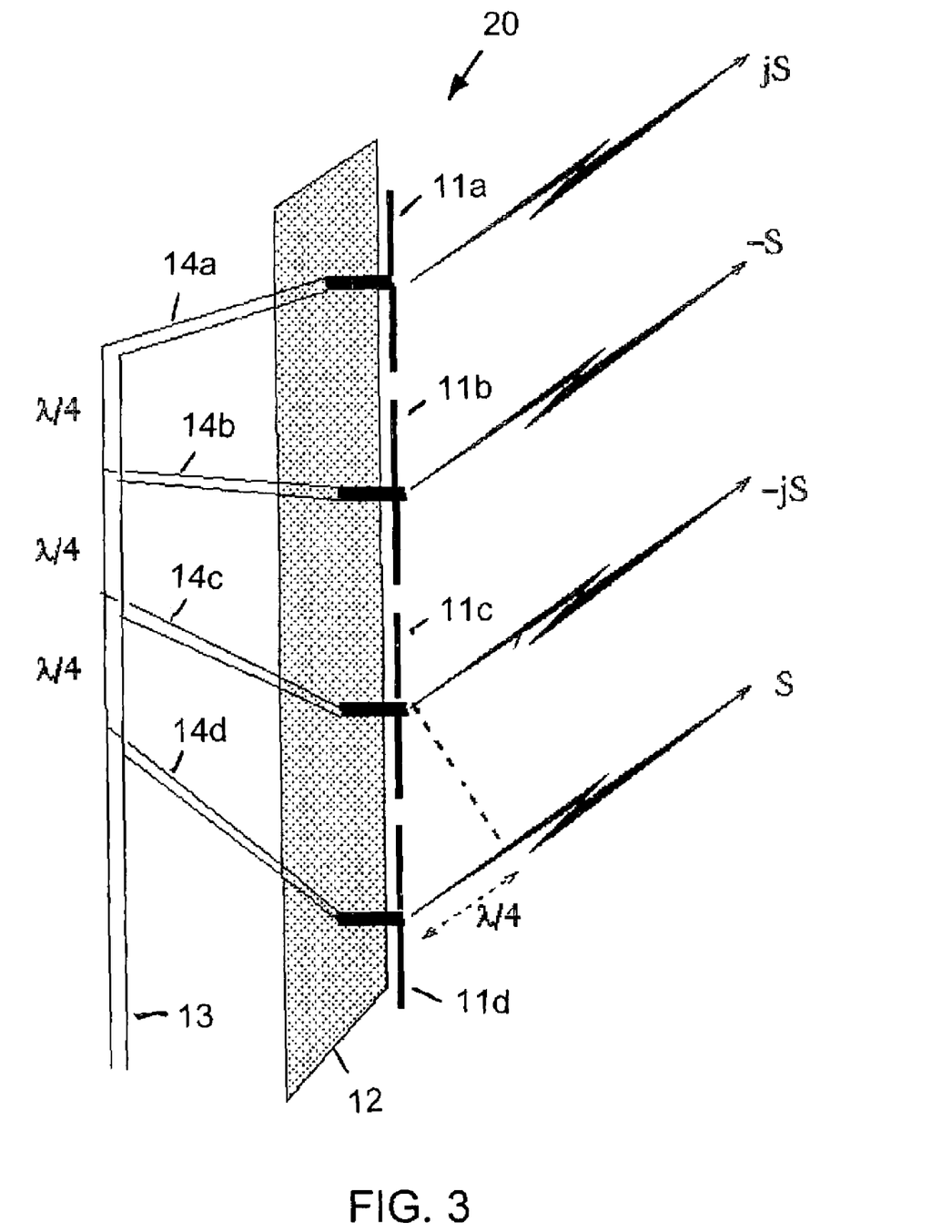
FIG. 3 is a side view illustrating an exemplary vertical collinear array suitable for achieving a radiation pattern elevated at 30° in the present invention.

FIG. 3 is a side view illustrating an exemplary vertical collinear array 20 suitable for achieving a radiation pattern elevated at 30° in the present invention. The feedline arrangement in this embodiment feeds the dipoles 11a-11d with progressively 90° phase-retarded signals, resulting in a radiation pattern that is tilted upwards by 30°. Cellular base station towers are spaced much more closely than would normally be required for an air traffic communications system. Thus the nearest cellular base station tower to a high-altitude aircraft is generally within about 15 km, giving an elevation angle to the aircraft of more than 30°. The 90° phase progression may be produced, for example, by tapping off the feeder line 13 at quarter-wave (λ/4) intervals, rather than half-wave intervals. Other arrangements for feeding the dipoles with the desired phases may also be utilized within the scope of the present invention.

With the assumption that the dipoles are spaced a half wavelength apart, the radiation at a 30° degree upward angle must travel a quarter wavelength further from each successively lower dipole, thus compensating for it receiving its drive signal through a quarter wavelength less of the feeder line. The radiation in a 30° degree upward direction is thus in phase from all dipoles, giving a peak of the array pattern at that elevation angle. Furthermore, the radiation from the array is zero at zero degrees elevation. This may be seen by denoting the radiated signals as:

S,
−jS (90° degrees retarded),
−S (180° degrees retarded), and
jS (270° degrees retarded).

It should be noted that these sum to zero in the horizontal direction. Thus, a signal transmitted in this manner reaches receivers suitably above the horizontal plane, such as aircraft in flight, while being substantially attenuated at receivers in the horizontal plane, such as cellular phones on the ground. The reciprocal is true for signals radiated from the array of FIG. 2, which has a null at a 30° elevation angle for the same reason. Thus signals radiated from the array of FIG. 2 would reach cellular phones on the ground while being substantially attenuated at receivers above the horizontal plane, particularly receivers at 30° elevation.

It will be appreciated by those of average skill in the art of antenna design that other element spacings, numbers of elements, and phasings may be utilized to produce beams tilted upwards at other angles, while still having zero or greatly reduced radiation in the horizontal plane. Likewise, an antenna array having a peak in the horizontal plane can be arranged to have a null at a desired angle of elevation.

Figure 4:
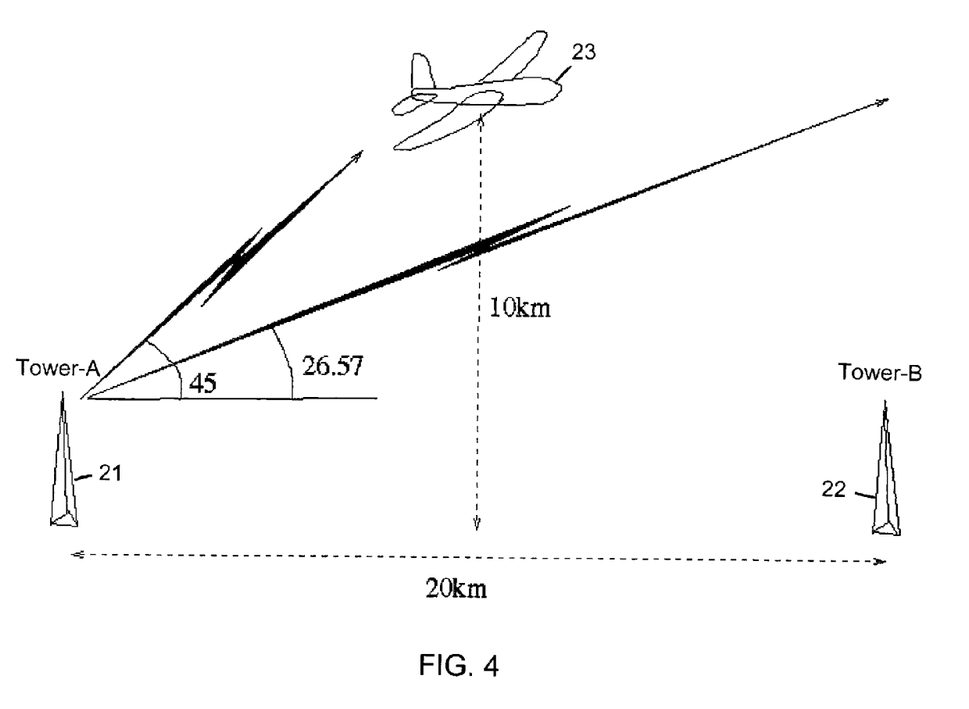
FIG. 4 is an illustrative drawing illustrating the geometry for communicating between cellular base station towers and an aircraft at cruising altitude.

FIG. 4 is an illustrative drawing illustrating the geometry for communicating between cellular base station towers 21 and 22 and an aircraft 23 at cruising altitude. It can be seen that, when Tower-A 21 and Tower-B 22 are 20 km apart, and the aircraft is at a cruising altitude of 10 km, the aircraft is always above approximately 260 elevation from either tower. A commercial passenger aircraft is only significantly under cruising altitude during takeoff or landing, in which case it is within the glide path of the airport. Since the airport is also a logical place to provide a cell site for the benefit of travelers, the cellular base station tower at the airport can be arranged to provide beams tilted upwards at the 15° glide path angle, and radiating away from the airport. This ensures that, even during take off and approach, when the aircraft is substantially lower than cruising altitude, there is a suitable cellular base station tower with which the aircraft can communicate.

Figure 5:
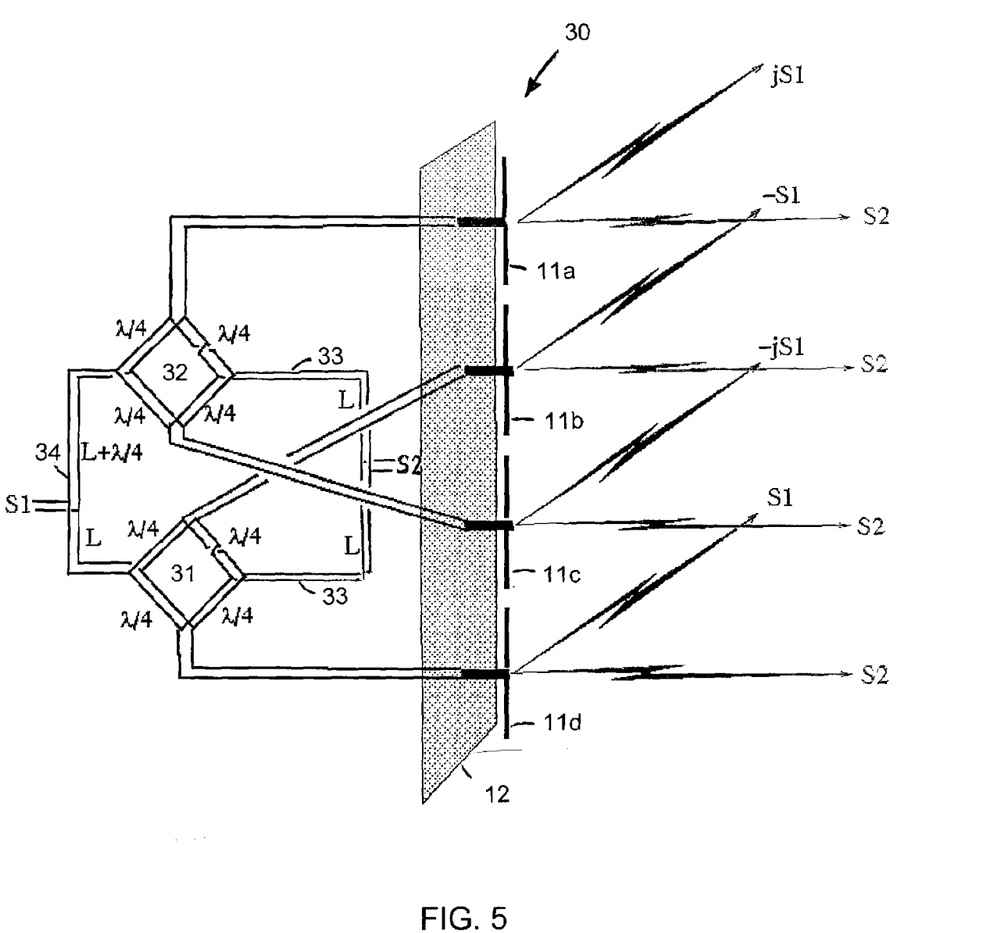
FIG. 5 is a side view illustrating a first exemplary embodiment of a vertical collinear array suitable for simultaneously providing both a horizontal beam and a beam elevated at 30° for different signals in the present invention.

FIG. 5 is a side view illustrating a first exemplary embodiment of a vertical collinear array 30 suitable for simultaneously providing both a horizontal beam and a beam elevated at 30° for different signals in the present invention. In addition, the radiation peak of one beam corresponds to a null in the other, and vice-versa, a property called "orthogonal beams".

Blocks 31 and 32 are 180° hybrid junctions, depicted here in open wire line form. A hybrid junction has two inputs and two outputs. A signal into a first of the two inputs is divided between the outputs in-phase, while a signal into the second of the two inputs divides to the outputs in anti-phase. In open wire line form, this is achieved by a reversing crossover of the wires in one of the four quarter-wavelength arms to form a Moebius loop. Such devices have also been built with coaxial cable, where reversal of the inner and outer conductor in one arm achieves approximately the same result.

By using hybrid junction 31 to feed antenna elements 11b and 11d, the elements can be driven either in phase (as required for the horizontal beam) or out of phase (as required for the upward-tilted beam). Hybrid junction 32 performs the same function for antenna elements 11a and 11c. Signal S2 is applied in-phase to the two in-phase hybrid junction inputs through equal length feeder lines 33 such that signal S2 is divided in phase between all four antenna elements, creating the horizontal beam. Signal S1, on the other hand, is applied 90° retarded to hybrid 32 relative to hybrid 31 by the extra quarter-wavelength in feeder line 34. In this way, signal S2 is divided between the four antenna elements with a progressive phase lag of 0°, 90°, 180°, and 270° from bottom to top, as required for signal S1 to be transmitted or received via the upward tilted beam.

The signal ports S1 and S2 may be connected to separate transmitter-receiver equipment so that communication with cellular phones using the horizontal beam can be provided simultaneously with communication to aircraft using the upward-tilted beam. The cellular equipment may be of any standard type, such as conforming to the IS95 or WCDMA UMT-2000(3G) standards, or to the GSM standards, or other suitable standards.

Figure 6:
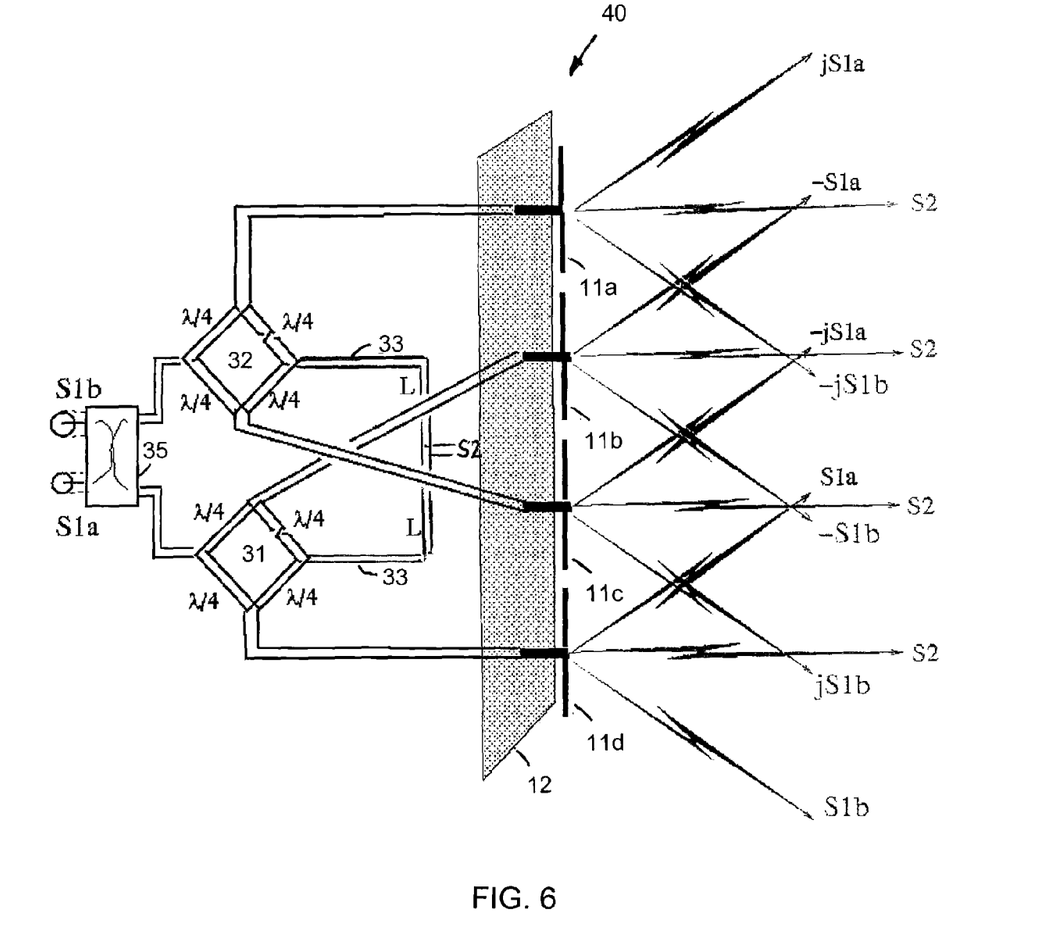
FIG. 6 is a side view illustrating a second exemplary embodiment of a vertical collinear array suitable for simultaneously providing both a horizontal beam and a beam elevated at 30° for different signals in the present invention.

FIG. 6 is a side view illustrating a second exemplary embodiment of a vertical collinear array 40 suitable for simultaneously providing both a horizontal beam and a beam elevated at 30° for different signals in the present invention. In this embodiment, the 90° phasing line 34 of FIG. 5 may be replaced with a quadrature −3 dB splitter (directional coupler 35). The directional coupler provides two ports, S1a and S1b, corresponding to an upward-tilted beam and a downward-tilted mirror image beam corresponding to phasing of 0°, 90°, 180°, 270° and 0°, −90°, −180°, −270°, respectively. The downward tilted beam still has a null in the horizontal plane, and so does not respond strongly to cellular signals unless emanating from very close to the tower. The downward tilting beam picks up aircraft transmissions reflected from the ground. The phase of these signals will be unknown, but the received energy may be utilized in a diversity-combining receiver. Near water, which provides an excellent reflective surface, these reflected signals may be as strong as the direct wave and thus offer a 3 dB improvement in signal to noise+ interference ratios.

In the case of CDMA, which is renowned for being able to re-use the same frequency spectrum in all cells, the upward and horizontal beams may use the same spectrum. In transmission, it is merely necessary to ensure that the total power transmitted from each beam is similar, so that the interference at a receiver from an unwanted beam to a wanted beam in simply the ratio of the two array patterns, which is always likely to be sufficient to ensure negligible mutual interference. There is additional interference from the horizontally radiated signals to the aircraft receiver caused by backscattering from illuminated ground objects, but this interference is tolerated by CDMA properties.

Figure 7:
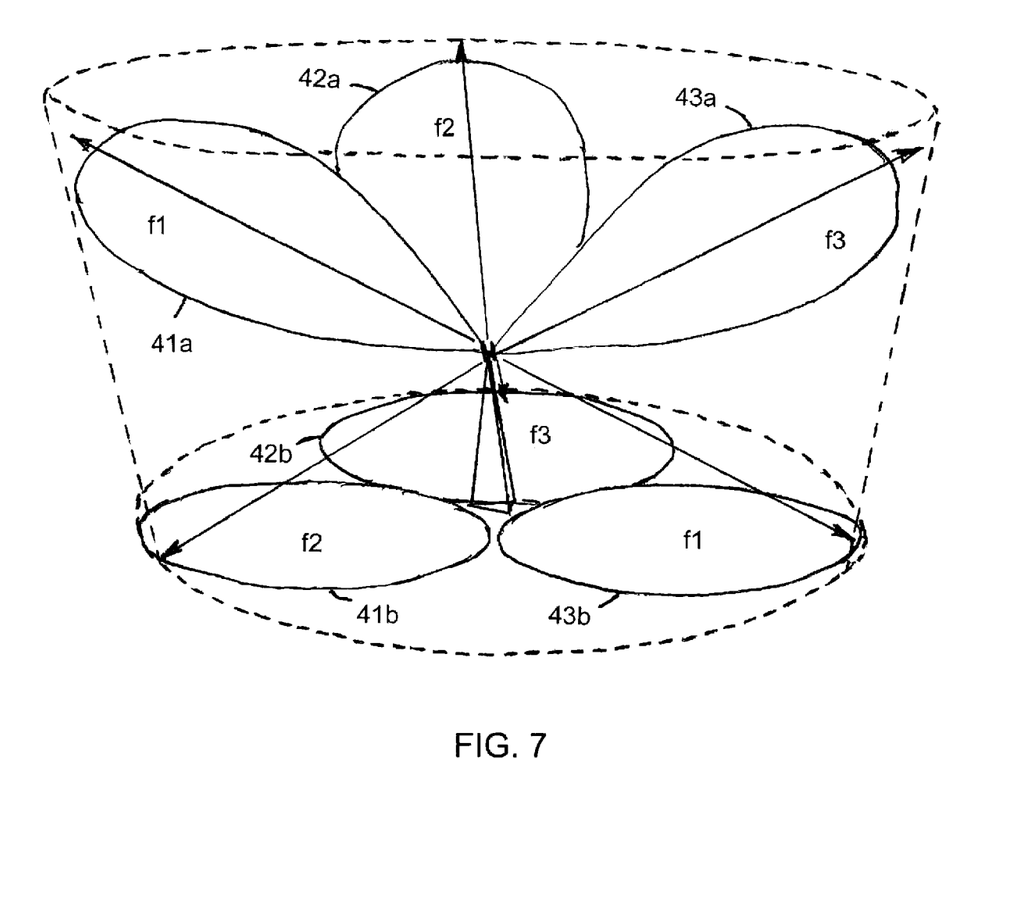
FIG. 7 is an illustrative drawing illustrating an intelligent frequency reuse plan when utilizing the present invention with the European Telecommunications Standards Institute's GSM standard.

FIG. 7 is an illustrative drawing illustrating an intelligent frequency reuse plan when utilizing the present invention with the European Telecommunications Standards Institute's GSM/EDGE standard. GSM transmissions utilize less spectrum than CDMA per signal, but require higher wanted to unwanted signal ratios, and thus do not attempt to reuse the same spectrum in every cell. They are also likely to be less tolerant of the backscattered interference. For mitigating the latter, an intelligent choice of the frequencies used in the three horizontal sectors relative to the three upwards tilted sectors may be made.

Use of different sets of frequency channels for the three ground-coverage sectors is illustrated by the labeling f1, f2, and f3. The set of channels represented by f1 is used for the upward-pointing beam 41a in the sector where the ground beam 41b uses the f2 channel set. Likewise, the upward beam 42a uses the f2 channel set over the ground use of the f3 channel set in sector 42b. Upward beam 43a uses the f3 channel set over the f1 ground beam 43b. In this way, the use of the same frequency for aircraft and ground communication is separated both in azimuth and elevation. Additionally, a third cyclic permutation of the three frequency sets can be constructed for use in yet another set of beams at a higher elevation than beams 41a, 42a, and 43a. This set of beams may be utilized to serve aircraft closer to the tower.

In principle, the vertical beam space of zero to 90° angle of elevation may be divided into any number of layers of beams, all using the same spectrum in the case a CDMA signal waveform is used, or alternatively, using a permutation of the 120° azimuthal sector spectrum allocations such that beams which are adjacent either in azimuth at the same elevation, or in elevation at the same azimuth, do not use the same spectrum. This provides beam-space separation for instances of re-use of the same frequency channels in order to maintain a higher ratio of wanted to unwanted signal strength at a desired receiver.

The present invention may include a control network to track aircraft and assign them to operate via the nearest or most appropriate cellular base station tower or towers. For example, the aircraft may be assigned to operate via the base station tower providing the highest quality signal. If an aircraft is too close to a particular tower, the elevation angle may be too great. Therefore, the control network may assign a base station tower farther away so as to place the aircraft within the elevated beam.

The invention may also include a power control system that operates to ensure that both the ground transmitter and the aircraft transmitter use only sufficient power to reach between the aircraft and the nearest tower, avoiding interference with more distant towers that may be using the same frequency for a different aircraft, or substantially more distant towers that may be receiving the unwanted aircraft signal as interference to their horizontal terrestrial cellular antenna lobes.

As in cellular communication networks, the control network includes a handoff system to assign different towers as the aircraft moves through the network. In one embodiment, the same transmission power is used from the tower towards the aircraft as from the tower towards the terrestrial users thereby ensuring that, for each intended receiver, the ratio of wanted to unwanted signal strength is determined by the ratio of the main lobe gain of the intended antenna to the sidelobe level of the other lobe. The third generation cellular system known as UMT-2000, which uses wideband CDMA (WCDMA), is a preferred transmission technique, so as to leverage the use of existing technology.

In another embodiment, different cellular networks may be connected to the same base station. One cellular network may serve ground-based subscribers through the horizontal antenna beams formed by the antenna array of the present invention. A second cellular network may serve airborne subscribers through the elevated antenna beams formed by the antenna array of the present invention.

Figure 8:
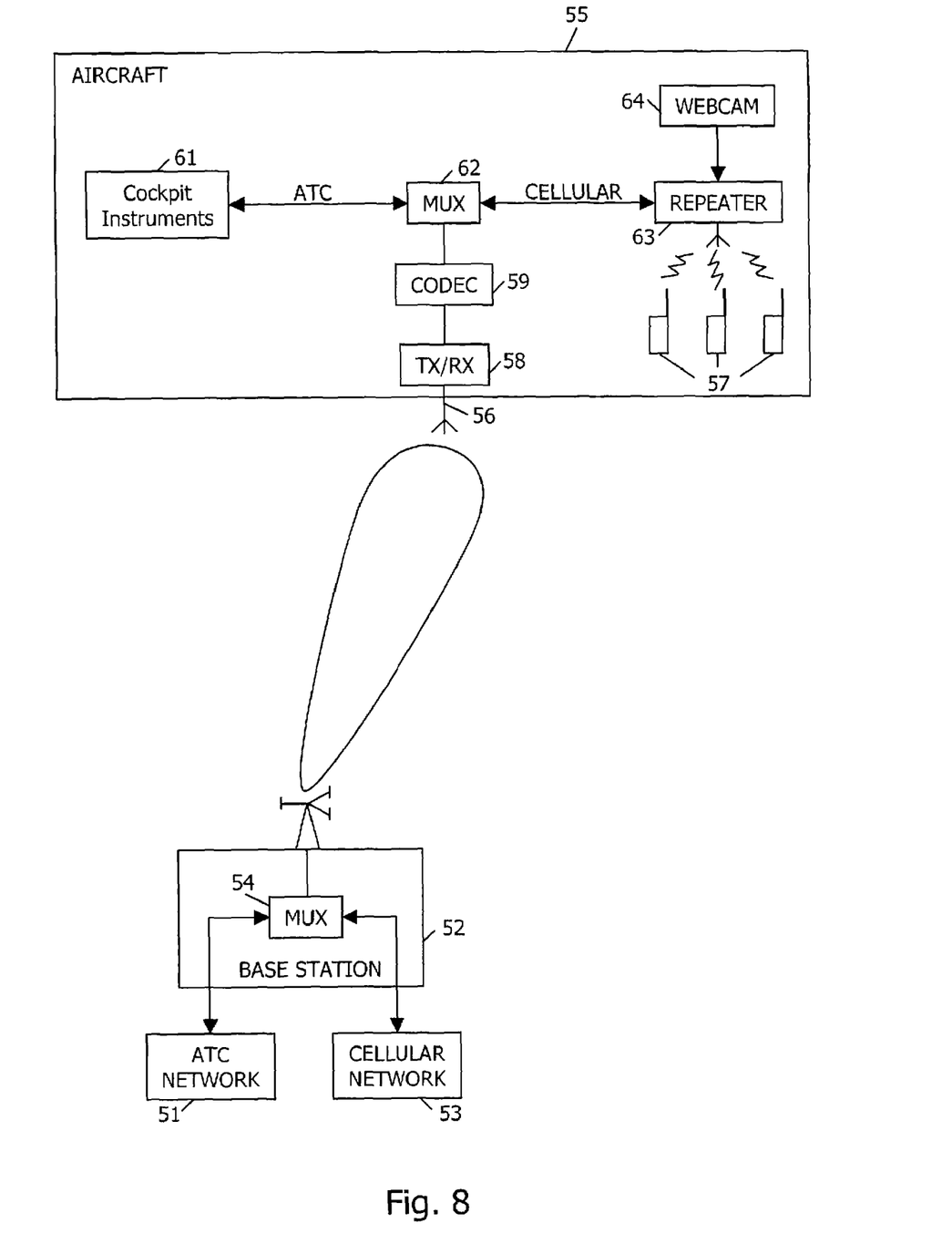
FIG. 8 is a simplified block diagram of an embodiment of the system of the present invention.

FIG. 8 is a simplified block diagram of another embodiment of the system of the present invention. An air traffic control (ATC) network 51 provides ATC information to the base station 52. Likewise, a cellular telecommunications network 53 provides telephone and wideband multi-media information to the base station. A multiplexer/de-multiplexer (MUX) 54 multiplexes the information, and the base station transmits the multiplexed information to an aircraft 55 using the antenna configuration of the present invention.

The radio signals from the base station are preferably received by an external antenna 56, which may be installed on the skin of the aircraft 55 such that the signal properties are more predictable than in the case of antennas on portable passenger devices 57 within the passenger cabin. An onboard transceiver 58 receives the signals and sends them to a codec 59, which may decode the ATC information and the cellular information in the data stream. The codec may then recode the ATC information in a format compatible with cockpit instruments 61. The codec may recode the cellular information in a format compatible with the portable passenger devices 57. The recoded information stream is then sent to a MUX 62, which separates the ATC information from the cellular information. The ATC information is sent to the cockpit instruments 61, while the cellular information is sent to an onboard relay or repeater 63 for retransmission within the aircraft.

The base station 52 may transmit the signals to the aircraft 55 utilizing, for example, High-Speed Downlink Packet Access (HSDPA) signals. After recoding by the codec 59, the cellular information may be retransmitted by the onboard repeater 63 using another or similar WCDMA protocol, a GSM or EDGE protocol, or a Bluetooth or 802.11 protocol. In this way, service can be provided within the aircraft to passenger devices 57 conforming to substantially any standard. Likewise, the on-board repeater receives reverse transmissions from the passenger devices and/or onboard security equipment such as a webcam 64. The reverse transmissions are recoded and multiplexed over the aircraft-to-ground link along with ATC information and security transmissions. Thus, the air-to-ground link may be thought of as providing backhaul communications for an onboard microcellular base station.

It should be noted that the invention may also communicate directly with onboard passenger devices 57 without the use of the onboard repeater or relay device 63. However, due to the variety of standards and performance of passenger devices, use of the repeater should provide better performance and flexibility.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. An antenna arrangement in a cellular base station for transmitting and receiving signals between the base station and an aircraft flying through a cell served by the base station, and for transmitting and receiving signals between the base station and ground-based mobile subscribers operating within the served cell, said antenna arrangement comprising:
   a vertically oriented array of antenna elements; and
   a feedline arrangement connected to each of the antenna elements, the feedline arrangement comprising:
      means for feeding the antenna elements with a first set of progressively phase-retarded signals, thereby generating an elevated antenna beam directed upward toward the aircraft; and
      means for feeding the antenna elements with a second set of signals that are progressively phase-retarded differently than the first set of signals, wherein the second set of signals generate a horizontal antenna beam directed toward the ground-based subscribers.

2. The antenna arrangement according to claim 1, wherein the elevated antenna beam is sufficiently separated in elevation from the horizontal antenna beam to eliminate mutual interference between the two beams.

3. The antenna arrangement according to claim 2, wherein a peak of the horizontal antenna beam is directed at zero degrees elevation, and a peak of the elevated antenna beam is directed at 30 degrees elevation.

4. The antenna arrangement according to claim 2, wherein the same frequency spectrum is used in the horizontal antenna beam and the elevated antenna beam.

5. The antenna arrangement according to claim 1, wherein the means for feeding the antenna elements with a first set of progressively phase-retarded signals progressively feeds the antenna elements with 90-degree phase-retarded signals starting with a lowest antenna element and moving upwards, thereby generating an elevated antenna beam directed upwards at 30 degrees.

6. A method in a cellular base station for transmitting and receiving signals between the base station and ground-based mobile subscribers operating within a served cell, and between the base station and an aircraft flying through the served cell, wherein the base station includes an antenna arrangement having a vertically oriented array of antenna elements, said method comprising:
   feeding the vertically oriented array of antenna elements with a first set of progressively phase-retarded signals, thereby generating a horizontal antenna beam through which signals are transmitted and received between the base station and the ground-based subscribers; and
   feeding the vertically oriented array of antenna elements with a second set of signals that are progressively phase-retarded differently than the first set of signals, thereby generating an elevated antenna beam through which signals are transmitted and received between the base station and the aircraft.

7. The method according to claim 6, wherein the elevated antenna beam is sufficiently separated in elevation from the horizontal antenna beam to eliminate mutual interference between the two beams.

8. The method according to claim 7, wherein:
   the horizontal antenna beam is generated with a peak directed at zero degrees elevation; and
   the elevated antenna beam is generated with a peak directed at 30 degrees elevation.

9. The method according to claim 7, wherein the same frequency spectrum is used in the horizontal antenna beam and the elevated antenna beam.

10. A cellular communications system for communicating with ground-based mobile subscribers located within a service region and with an aircraft flying through the service region, wherein the service region is provided with a plurality of ground-based antenna towers spaced at intervals, each of said antenna towers serving a cell within the service region, said system comprising:
    means for sending communication signals from a communications network to the plurality of antenna towers; and
    an antenna arrangement located on at least one of the antenna towers, comprising:
       a vertically oriented array of antenna elements; and
       a feedline arrangement connected to each of the antenna elements, said feedline arrangement comprising:
          means for feeding the antenna elements with a first set of progressively phase-retarded signals, thereby generating an elevated antenna beam directed upward toward the aircraft; and
          means for feeding the antenna elements with a second set of progressively phase-retarded signals, thereby generating a horizontal antenna beam directed toward the ground-based mobile subscribers.

11. The system according to claim 10, wherein the means for generating the horizontal antenna beam generates a horizontal antenna beam having a vertical beam width wherein communications with the ground-based subscribers does not cause significant interference to communications with the aircraft.

12. The system according to claim 11, wherein the means for generating the elevated antenna beam generates an elevated antenna beam having a vertical beam width wherein communications with the aircraft does not cause significant interference to communications with the ground-based subscribers.

13. The system according to claim 12, wherein the same frequency spectrum is used in the horizontal antenna beam and the elevated antenna beam.

14. The system according to claim 13, wherein the antenna arrangement generates azimuthally-spaced horizontal and elevated antenna beams in azmuthal sectors of a served cell, and the frequency spectrum is partitioned between the sectors of the azimuthally-spaced horizontal antenna beams, and is also partitioned between the azimuthal sectors of at least one of the elevated antenna beams.

15. The system according to claim 14, wherein the partitioning of the frequency spectrum between the azimuthal sectors of the horizontal antenna beams is rotated in comparison to the partitioning between the azimuthal sectors of the at least one elevated antenna beam, wherein in any one sector, the horizontal antenna beam and the elevated antenna beam used different frequency spectrums.

16. The system according to claim 10, wherein the cellular communications system is a GSM/EDGE cellular communications system.

17. The system according to claim 10, wherein the cellular communications system is a Code Division Multiple Access (CDMA) cellular communications system.

18. The system according to claim 17, wherein the same frequency spectrum is used in all antenna beams from the same tower.

19. The system according to claim 18, wherein transmissions from different beams of the same tower use orthogonal CDMA codes.

20. The system according to claim 10, wherein the means for sending communication signals from a communications network to the plurality of antenna towers includes:

means for sending communication signals from a first communications network to the antenna arrangement for communicating with the ground-based subscribers; and means for sending communication signals from a second, different communications network to the antenna arrangement for communicating with the aircraft.

21. The system according to claim 10, wherein the antenna arrangement is located on a plurality of antenna towers, and the system further comprises a controller for tracking the aircraft and assigning the aircraft to operate via an antenna tower providing the highest quality signal.

22. The system according to claim 21, wherein the controller also hands off the aircraft from a first antenna tower to a second antenna tower when the aircraft moves from a first cell to a second cell served by the first and second antenna towers, respectively.

23. The system of claim 10, further comprising a power control mechanism for controlling transmission power levels for a ground transmitter at the antenna tower and an airborne transmitter utilized by the aircraft, wherein the power control mechanism ensures that both the ground transmitter and the airborne transmitter transmit at a power level sufficient for transmitted signals to reach only between the aircraft and the nearest antenna tower.

24. The system of claim 10, further comprising a power control mechanism for ensuring that the same transmission power level is utilized to transmit signals in the elevated antenna beam as is utilized to transmit signals in the horizontal antenna beam.

25. The system according to claim 10, wherein the means for sending communication signals from a communications network to the plurality of antenna towers includes means for sending a wideband multi-media communication signal to the antenna arrangement, wherein the antenna arrangement transmits the wideband multi-media communication signal in the elevated antenna beam to the aircraft.

26. A cellular communications system for communicating with ground-based mobile subscribers located within a cell and with an aircraft flying through the cell, said system comprising:

a ground-based base station serving the cell, said ground-based base station including an antenna arrangement for generating an elevated antenna beam for communicating with the aircraft, wherein the ground-based base station receives information from an air traffic control (ATC) network and from a cellular telecommunications network, said ground-based base station including a multiplexer for multiplexing information from the ATC network with information from the cellular network into a data stream sent to the aircraft with the elevated antenna beam;

a transceiver onboard the aircraft for communicating with the ground-based base station; and a microcellular base station connected to the transceiver for communicating with portable communication devices onboard the aircraft.

27. The system according to claim 26, further comprising a multiplexer onboard the aircraft for de-multiplexing the data stream to separate the ATC information from the cellular information, wherein the cellular information is sent to the microcellular base station for retransmission to the portable communication devices.

28. The system according to claim 27, further comprising a codec for decoding the data stream received from the ground-based base station, and for recoding the cellular information in a format utilized by the portable communication devices.

29. The system according to claim 28, wherein the multiplexer sends the ATC information to cockpit instruments, and the codec recodes the ATC information in a format utilized by the cockpit instruments.

* * * * *

UNITED STATES PATENT AND TRADEMARK OFFICE
CERTIFICATE OF CORRECTION

PATENT NO.       : 7,801,521 B2                                                 Page 1 of 1
APPLICATION NO.  : 11/383120
DATED            : September 21, 2010
INVENTOR(S)      : Dent It is certified that error appears in the above-identified patent and that said Letters Patent is hereby corrected as shown below:

In Column 4, Line 44, delete "1200" and insert -- 120° --, therefor.

In Column 5, Line 59, delete "260" and insert -- 26° --, therefor.

Signed and Sealed this
Twenty-second Day of February, 2011

David J. Kappos
*Director of the United States Patent and Trademark Office*